(12) United States Patent
Nakamura et al.

(10) Patent No.: US 11,034,274 B2
(45) Date of Patent: Jun. 15, 2021

(54) UTILITY VEHICLE

(71) Applicant: KAWASAKI JUKOGYO KABUSHIKI KAISHA, Hyogo (JP)

(72) Inventors: Kenta Nakamura, Kakogawa (JP); Itsuo Takegami, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 102 days.

(21) Appl. No.: 16/507,232

(22) Filed: Jul. 10, 2019

(65) Prior Publication Data

US 2019/0329688 A1    Oct. 31, 2019

Related U.S. Application Data

(63) Continuation-in-part of application No. 15/889,795, filed on Feb. 6, 2018, now Pat. No. 10,589,653.

(51) Int. Cl.
*B60N 3/02* (2006.01)

(52) U.S. Cl.
CPC .................................... *B60N 3/026* (2013.01)

(58) Field of Classification Search
CPC ..................................................... B60N 3/026
USPC ....................................................... 296/1.02
See application file for complete search history.

(56) References Cited

U.S. PATENT DOCUMENTS

| | | | |
|---|---|---|---|
| 8,827,028 B2* | 9/2014 | Sunsdahl | B60K 5/10 |
| 8,998,253 B2* | 4/2015 | Novotny | B62D 21/12 |
| | | | 280/756 |
| 9,073,454 B2 | 7/2015 | Shinbori et al. | |
| 10,589,653 B2* | 3/2020 | Takegami | B60N 3/026 |

* cited by examiner

*Primary Examiner* — Joseph D. Pape
*Assistant Examiner* — Dana D Ivey
(74) *Attorney, Agent, or Firm* — Wenderoth, Lind & Ponack, L.L.P.

(57) ABSTRACT

A utility vehicle includes a passenger grip for a crew seated on a passenger seat. The passenger grip includes a handle grip having an arm part extending from a dashboard toward the passenger seat and a grip part provided at the arm part and gripped by the crew seated on the passenger seat, a holder outserted to the arm part of the handle grip and holding the arm part movably forward and backward in an extending direct on of the arm part, and a single-action look mechanism provided at the holder and fixing the handle grip to the holder. The single-action lock mechanism includes a lock pin having a distal end penetrating a through hole provided at the holder and engaged with at least one engagement hole provided at the arm part, a spring biasing the lock pin toward the arm part, a housing fixed to the holder and accommodating the lock pin and the spring, and a knob disposed outside the housing and connected to the lock pin.

6 Claims, 15 Drawing Sheets

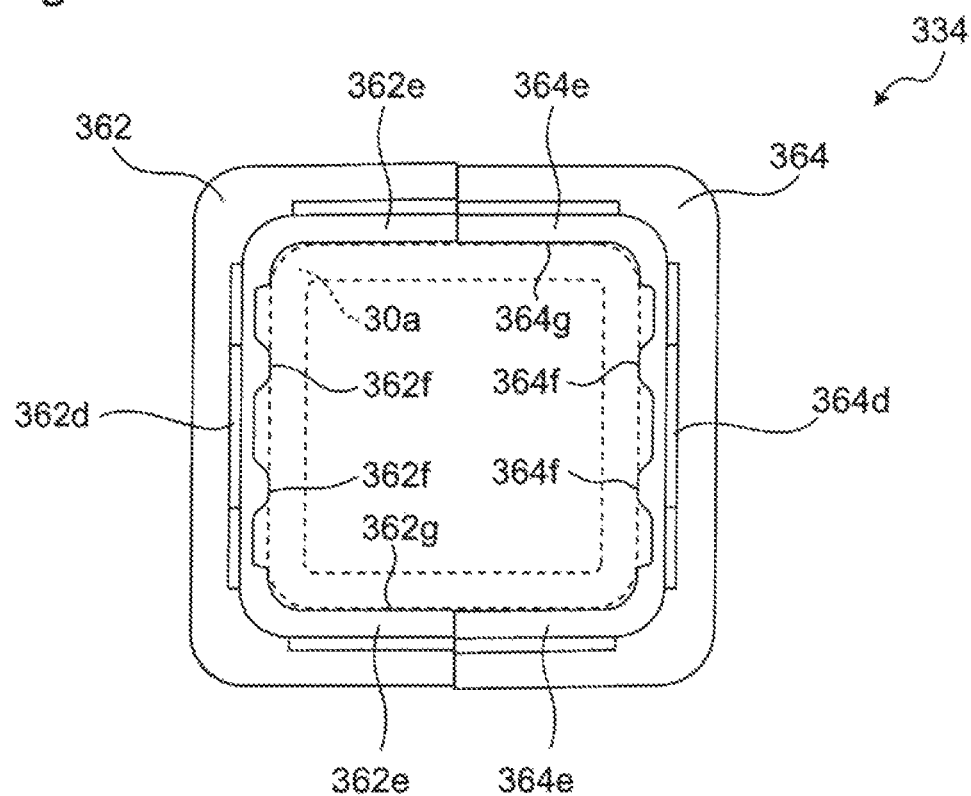
Fig.16
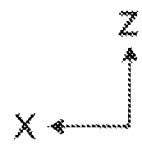

UTILITY VEHICLE

BACKGROUND OF THE INVENTION

1. Technical Field

The present invention relates to a utility vehicle.

2. Description of Related Art

As disclosed in U.S. Pat. No. 9,073,454 and the like, there has been known a utility vehicle including a passenger grip provided ahead of a passenger seat and gripped by a crew seated on the passenger seat.

The passenger grip provided ahead of the passenger seat is preferred to easily be mounted and dismounted as necessary.

SUMMARY

In view of the above, it is an object of the present invention to provide a utility vehicle including a passenger grip configured to be mounted and dismounted easily.

In order to achieve this object, according to an aspect of the present invention, there is provided
a utility vehicle including
a passenger grip for a crew at seated on passenger seat,
the passenger grip including
a handle grip having an arm part extending from a dashboard toward the passenger seat, and a grip part provided at the arm part and gripped by the crew seated on the passenger seat,
a holder outserted to the arm part of be handle grip and holding the arm part movably forward and backward in an extending direction of the arm part, and
a single-action lock mechanism provided at be holder and fixing the handle grip to the holder,
the single-action lock mechanism including
a lock pin having a distal end penetrating a through hole provided at the holder and engaged with at least one engagement hole provided at the arm part,
a spring biasing the lock pin toward the arm part,
a housing fixed to the holder and accommodating the lock pin and the spring, and
a knob disposed outside the housing and connected be the lock pin.

According to another aspect of the present invention, there is provided
a utility vehicle including
a passenger grip for a crew seated on a passenger seat,
the passenger grip including
a handle grip provided with an arm part that extends in a first direction from a dashboard toward the passenger seat and that has a shape of a quadrangular prism, and a grip part provided at the arm part and gripped by the crew seated on the passenger seat,
a holder that is outserted to the arm part of the handle grip, holds the arm part movably forward and backward in the first direction, and has a rectangular tubular shape,
a bush that is inserted into the holder guides the arm part of the handle grip so as to be movable forward and backward, is made of a resin material, and has a rectangular tubular shape, and
a single-action lock mechanism provided at the holder and fixing the handle grip to the holder,
the single-action lock mechanism including
a lock pin having a distal end penetrating a through hole provided at the holder and engaged with at least one engagement hole provided at the arm part,
a spring biasing the lock pin toward the arm part,
a housing fixed to the holder and accommodating the lock pin and the spring, and
a knob disposed outside the housing and connected to the lock pin,
the bush including
a first semi-cylindrical member and a second semi-cylindrical member that face each other in a second direction orthogonal to the first direction, and
at least one guide surface part provided on at least one of inner surfaces of be first and second semi-cylindrical members, the guide surface part being a flat surface parallel to the first direction and coming in surface contact with the arm part of the handle grip in a slidable manner.

The configuration according to such an aspect enables the passenger grip of the utility vehicle to be mounted and dismounted easily.

BRIEF DESCRIPTION OF THE DRAWINGS

FIG. 16 is a rear view of a bush in a utility vehicle according to still another embodiment.

DETAILED DESCRIPTION

Figure 1:
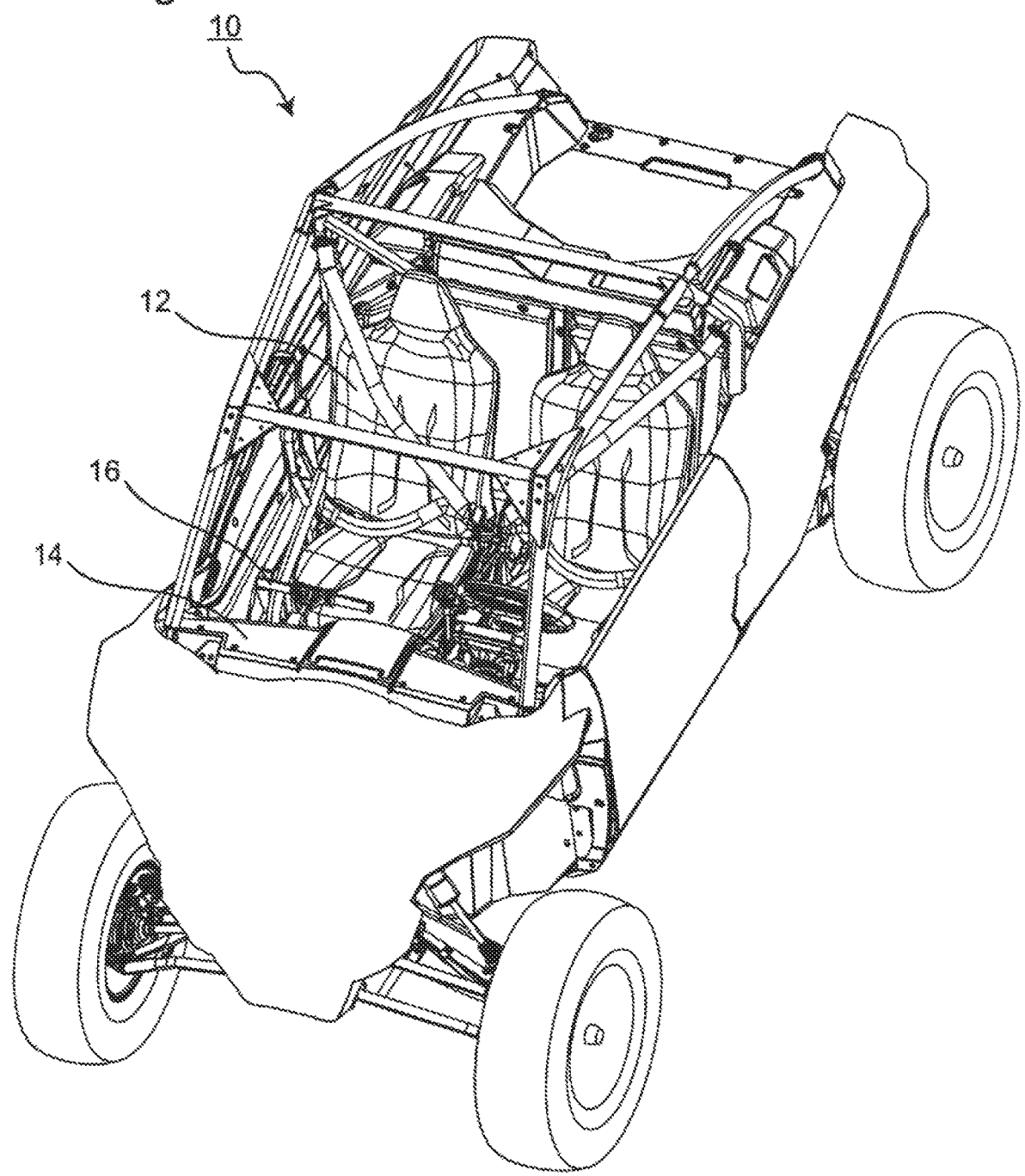
FIG. 1 is a perspective view of a utility vehicle according to an aspect of the present invention.

According to an aspect of the present invention, a utility vehicle includes a passenger grip for a crew seated on a passenger seat, the passenger grip including a handle grip having an arm part extending from a dashboard toward the passenger seat, and a grip part provided at the arm part and gripped by the crew seated on the passenger seat, a holder outserted to the arm part of the handle grip and holding the arm part movably forward and backward in an extending direction of the arm part, and a single-action lock mechanism provided at the holder and fixing the handle grip to the holder, the single-action lock mechanism including a lock pin having a distal end penetrating a through hole provided at the holder and engaged with at least one engagement hole provided at the arm part, a spring biasing the lock pin toward the arm part, a housing fixed to the holder and accommodating the lock pin and the spring, and a knob disposed outside the housing and connected to the lock pin;

For example, the holder is disposed in a space behind the dashboard, the arm part of the handle grip extends from the space behind the dashboard toward a cabin space through an arm through hole provided at the dashboard, and the knob of the single-action lock mechanism is positioned in a glove box provided at the dashboard.

For example the arm through hole is provided above the glove box, and the knob of the lock mechanism is positioned adjacent to a ceiling surface of an interior space of the glove box.

For example, the dashboard is provided with a hood positioned above the arm through hole and covering the arm through hole.

For example, the at least one engagement hole at the arm part of the handle grip includes a plurality of engagement holes aligned in the extending direction of the arm part.

For example, the holder is detachably attached to a frame of the utility vehicle extending in the space behind the dashboard.

According to another aspect of the present invention, a utility vehicle includes a passenger grip for a crew seated on a passenger seat, the passenger grip including a handle grip provided with an arm part that extends in a first direction from a dashboard toward the passenger seat and that has a shape of a quadrangular prism, and a grip part provided at the arm part and gripped by the crew seated on the passenger seat, a holder that is outserted to the arm part of the handle grip, holds the arm part movably forward and backward in the first direction, and has a rectangular tubular shape, a bush that is inserted into the holder, guides the arm part of the handle grip so as to be movable forward and backward, is made of a resin material, and has a rectangular tubular shape, and a single-action lock mechanism provided at the holder and fixing the handle grip to the holder, the single-action lock mechanism including a lock pin having a distal end penetrating a through hole provided at the holder and engaged with at least one engagement hole provided at the arm part, a spring biasing the lock pin toward the arm part, a housing fixed to the holder and accommodating the lock pin and the spring, and a knob disposed outside the housing and connected to the lock pin, the bush including a first semi-cylindrical member and a second semi-cylindrical member that face each other in a second direction orthogonal to the first direction, and at least one guide surface part provided on at least one of inner surfaces of the first and second semi-cylindrical members, the guide surface part being a flat surface parallel to the first direction and coming in surface contact with the arm part of the handle grip in a slidable manner.

For example, the first and second semi-cylindrical members respectively have bottom walls that face, each other in the second direction across the arm part of the handle grip, each of the bottom walls including the guide surface part.

For example, the first and second semi-cylindrical members respectively have pairs of side walls that extend from both ends of the bottom walls in a third direction orthogonal to both the first direction and the second direction, each of the pairs of side walls extending from the corresponding bottom wall so as to be away from each other with distance from the bottom wall.

For example, the side wall on one side in the third direction of the pair of side wads in the first semi-cylindrical member includes the guide surface part, and the side wall on the other side in the third direction of the pair of side walls in the second semi-cylindrical member includes the guide surface part.

For example, the first and second semi-cylindrical members include engagement parts which are engaged with each other.

For example, the first and second semi-cylindrical members are identical.

An embodiment will now be described in more detail with reference to FIGS. 1 to 10. FIGS. 1 to 10 depict a utility vehicle according to an embodiment.

Unnecessarily detailed description may not be made where appropriate. For example, an already well known matter may not be described in detail or substantially identical configurations may not be descried repeatedly. It is to prevent the following description from becoming unnecessarily long as well as to allow those skilled in the art to easily understand the description.

The inventors provide the accompanying drawings and the following description in order to allow those skilled in the art to fully understand the present disclosure, without any intention to limit a subject matter recited in the patent claims.

Directions "front", "rear", "left", and "right" mentioned in the present application are viewed from a driver boarding and driving the utility vehicle.

As depicted in FIG. 1, a utility vehicle 10 according to the embodiment includes a passenger grip 16 provided at a dashboard 14 ahead of a passenger seat 12 and gripped by a crew seated on the passenger seat 12.

Figure 2:
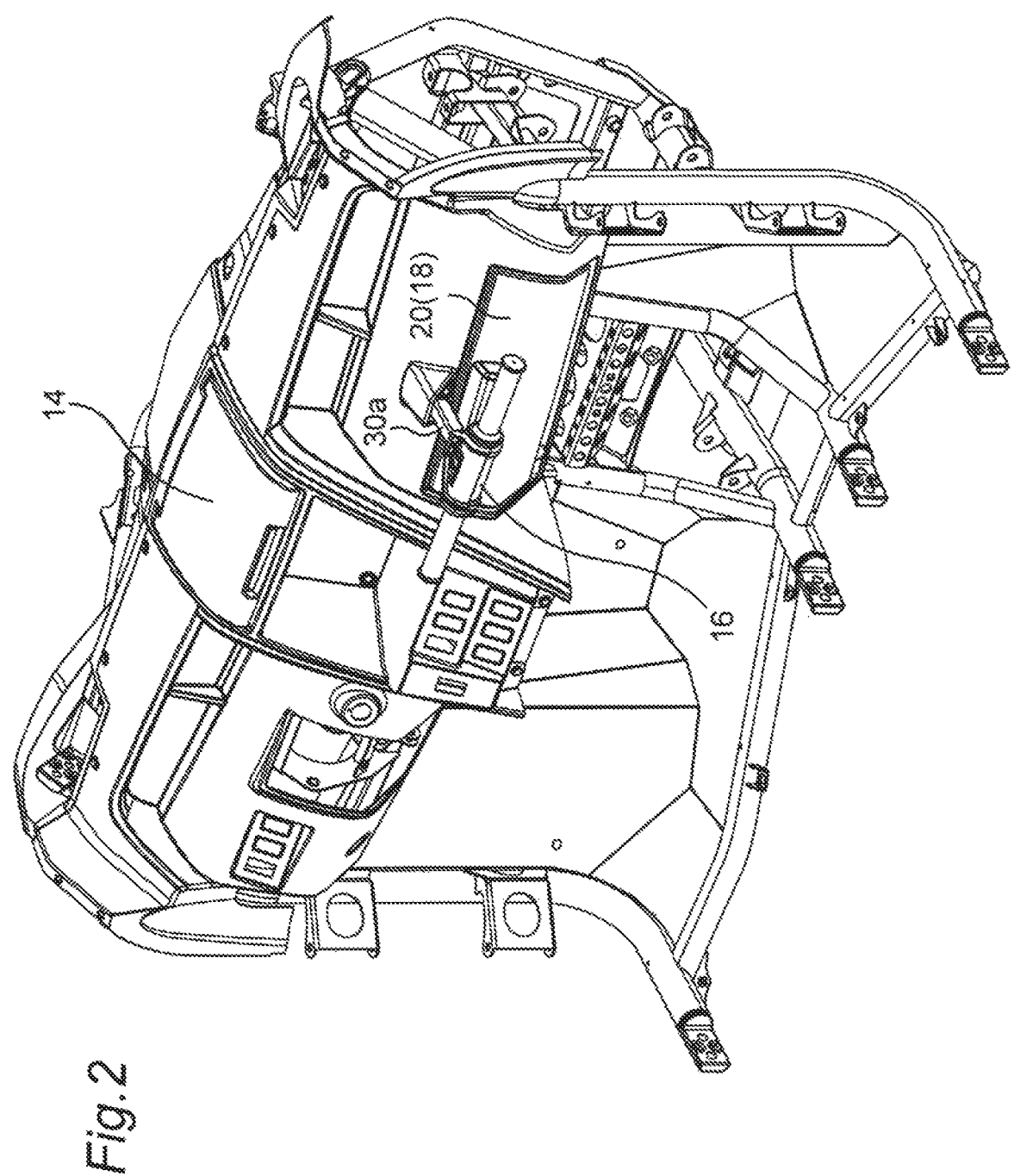
FIG. 2 is a perspective view of a dashboard of the utility vehicle.

As depicted in FIGS. 1 and 2, the passenger grip 16 projects from the dashboard 14 toward the passenger seat 12. In the embodiment, the passenger grip 16 is provided above a glove box 18 (above a box cover 20 thereof) of the dashboard 14.

Figure 3:
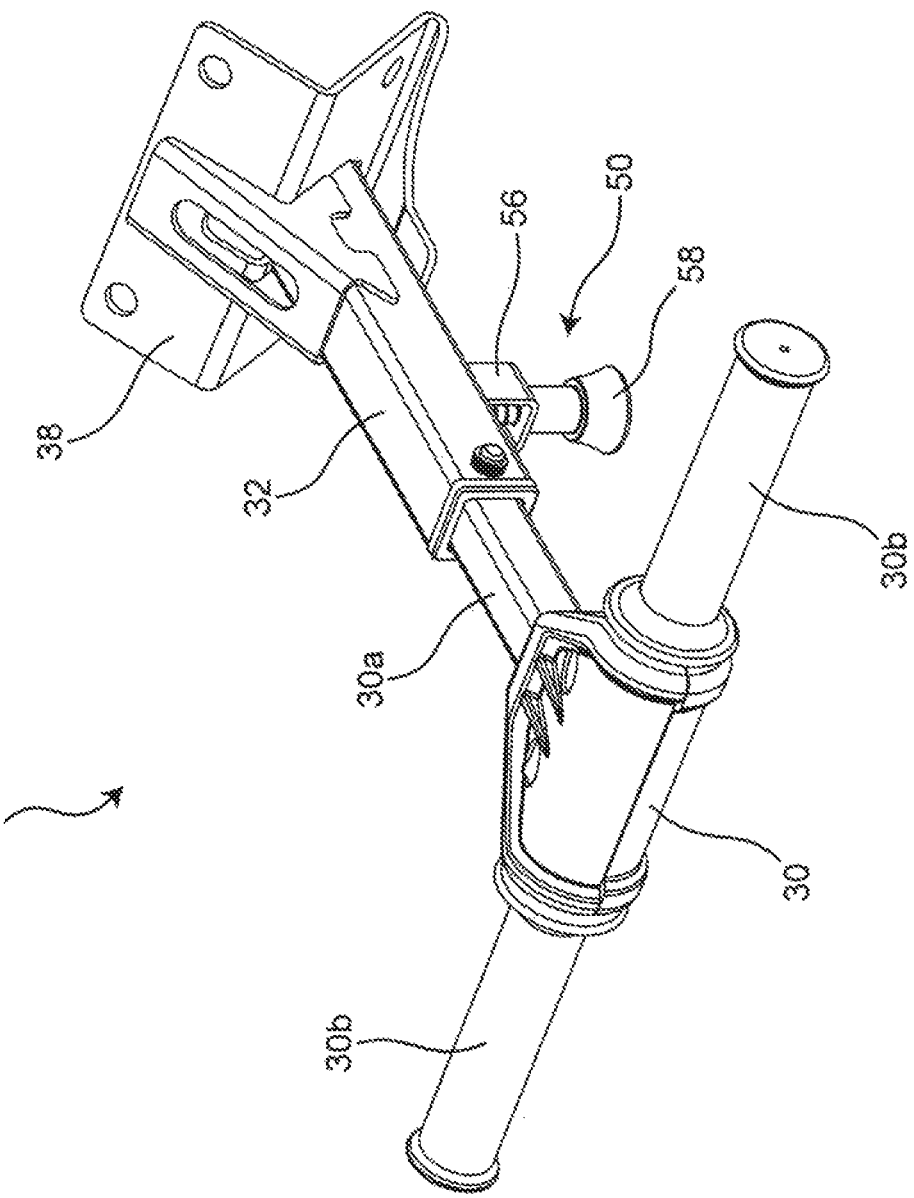
FIG. 3 is a perspective view of a passenger grip.
Figure 4:
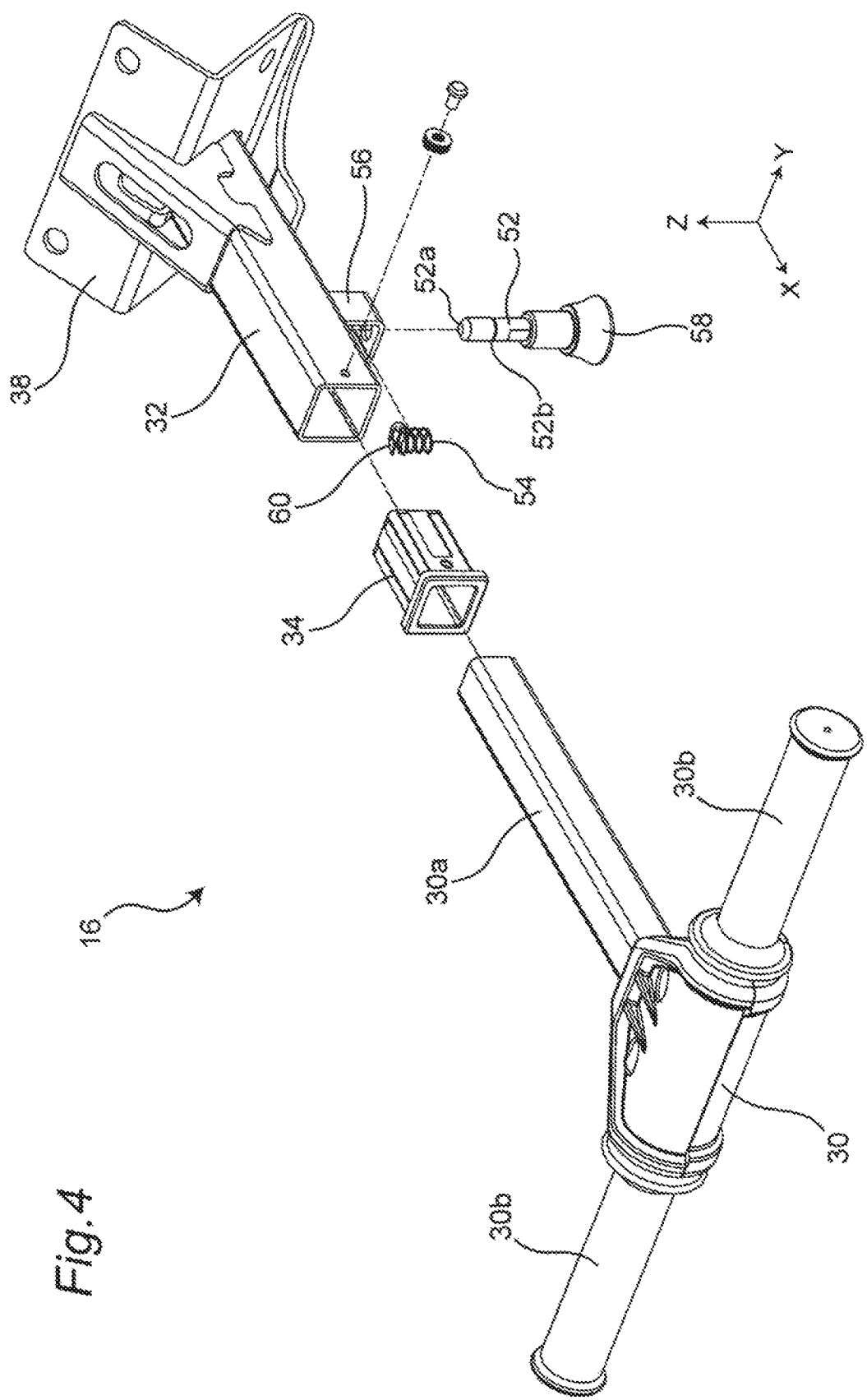
FIG. 4 is an exploded view of the passenger grip.
Figure 5:
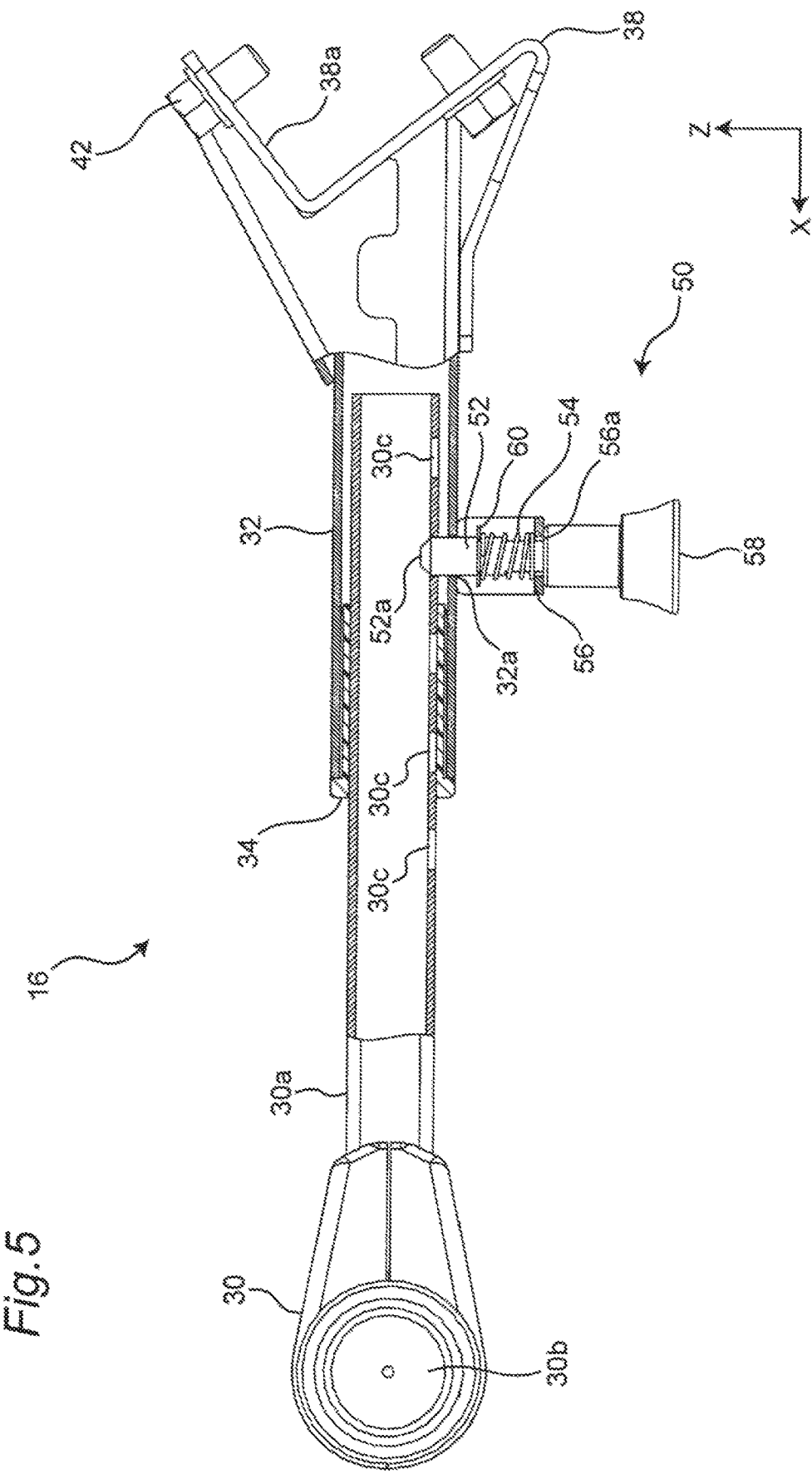
FIG. 5 is a partial sectional view of the passenger grip.

FIG. 3 is a perspective view of the passenger grip, FIG. 4 is an exploded view of the passenger grip, and FIG. 5 is a partial sectional view of the passenger grip.

As depicted in FIGS. 3 and 4, the passenger grip 16 includes a handle grip 30 gripped by the crew seated on the passenger seat 12, and a holder 32 detachably holding the handle grip 30.

In the embodiment, the handle grip 30 has a "T" shape. The handle grip 30 includes an arm part 30*a* extending from the dashboard 14 toward the passenger seat 12 as depicted in FIG. 2, and a grip part 30*b* extending in the vehicle width direction of the utility vehicle 10 from a distal end of the arm part 30*a* as depicted in FIG. 3 and gripped by the crew seated on the passenger seat 12.

In the embodiment, the arm part 30*a* of the handle grip 30 according to the present embodiment is configured by a hollow metallic pipe member having a quadrilateral cross section. The grip part 30*b* is made of a rubber material, a resin material, or the like, and is detachably attached to the handle grip 30. That is, the grip part 30*b* is replaceable.

The holder 32 of the passenger grip 16 can be outserted to the arm part 30*a* of the handle grip 30, and is a tubular metallic pipe member having a quadrilateral cross section, in the embodiment. The holder 32 holds the arm part 30*a* movably forward and backward in an extending direction of the arm part 30*a* of the handle grip 30. The holder 32 can alternatively have a shape different from the tubular shape as long as the holder 32 can be outserted to the arm part 30*a* of the handle grip 30. In the embodiment, the holder 32 is provided with a bush 34. The arm part 30*a* of the handle grip 30 is inserted to the bush 34, so that the handle grip 30 becomes movable forward and backward smoothly with respect to the holder 32.

Figure 6:
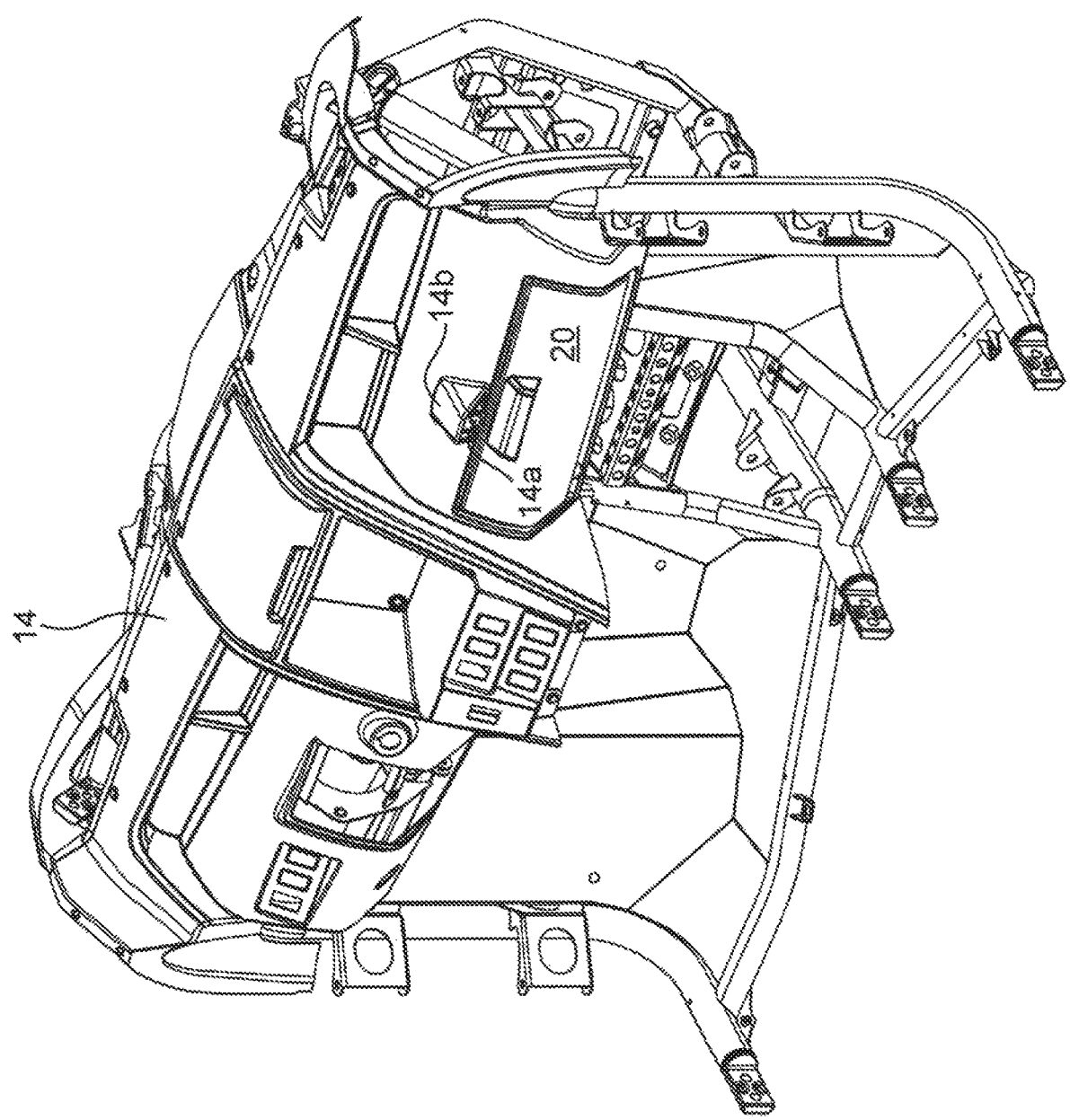
FIG. 6 is a perspective view of the dashboard with the passenger grip being removed.
Figure 7:
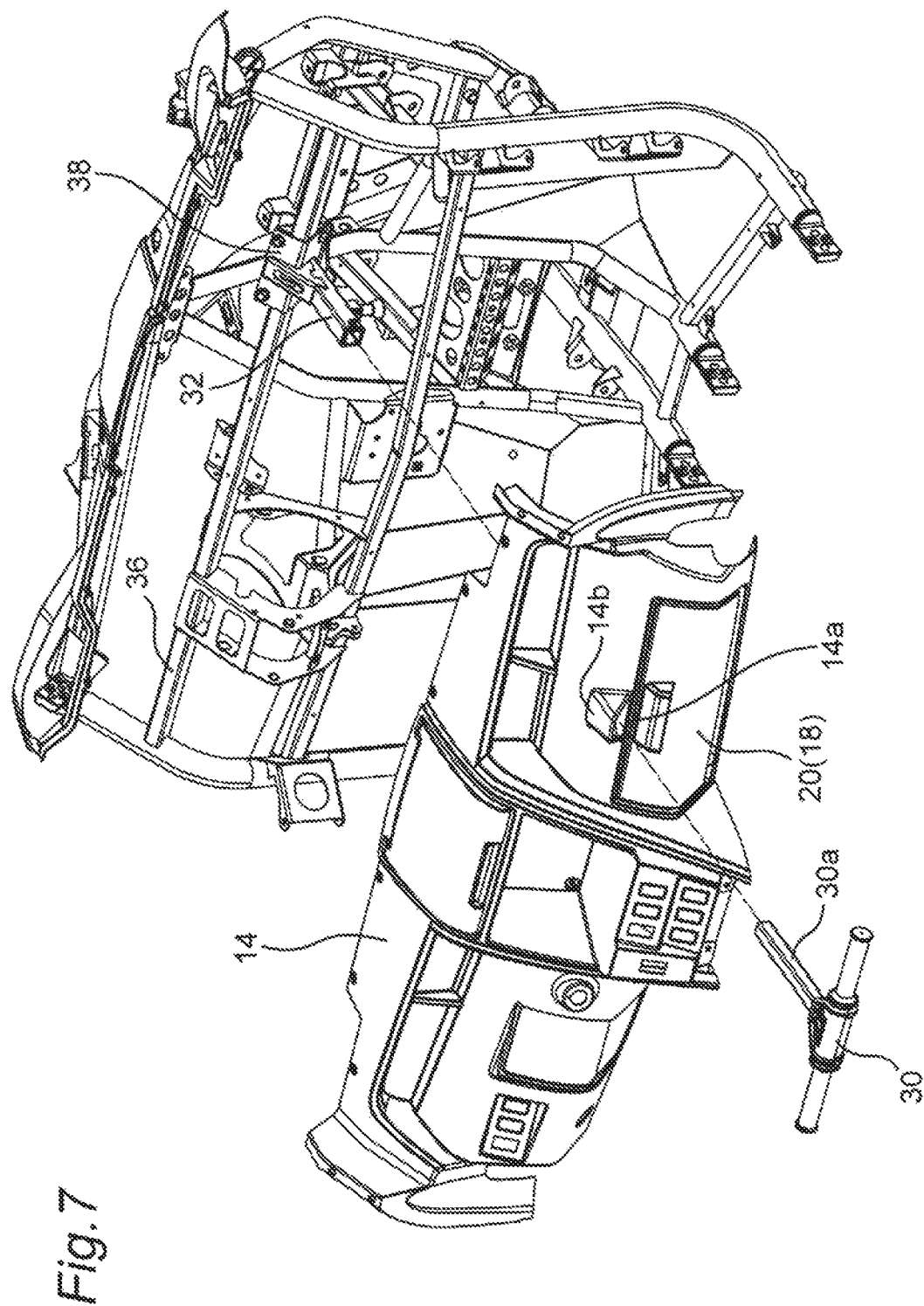
FIG. 7 is a perspective view depicting mounting the passenger grip to a frame.

FIG. 6 depicts the dashboard from which the handle grip is removed. FIG. 7 depicts a state where the dashboard is detached.

Figure 8:
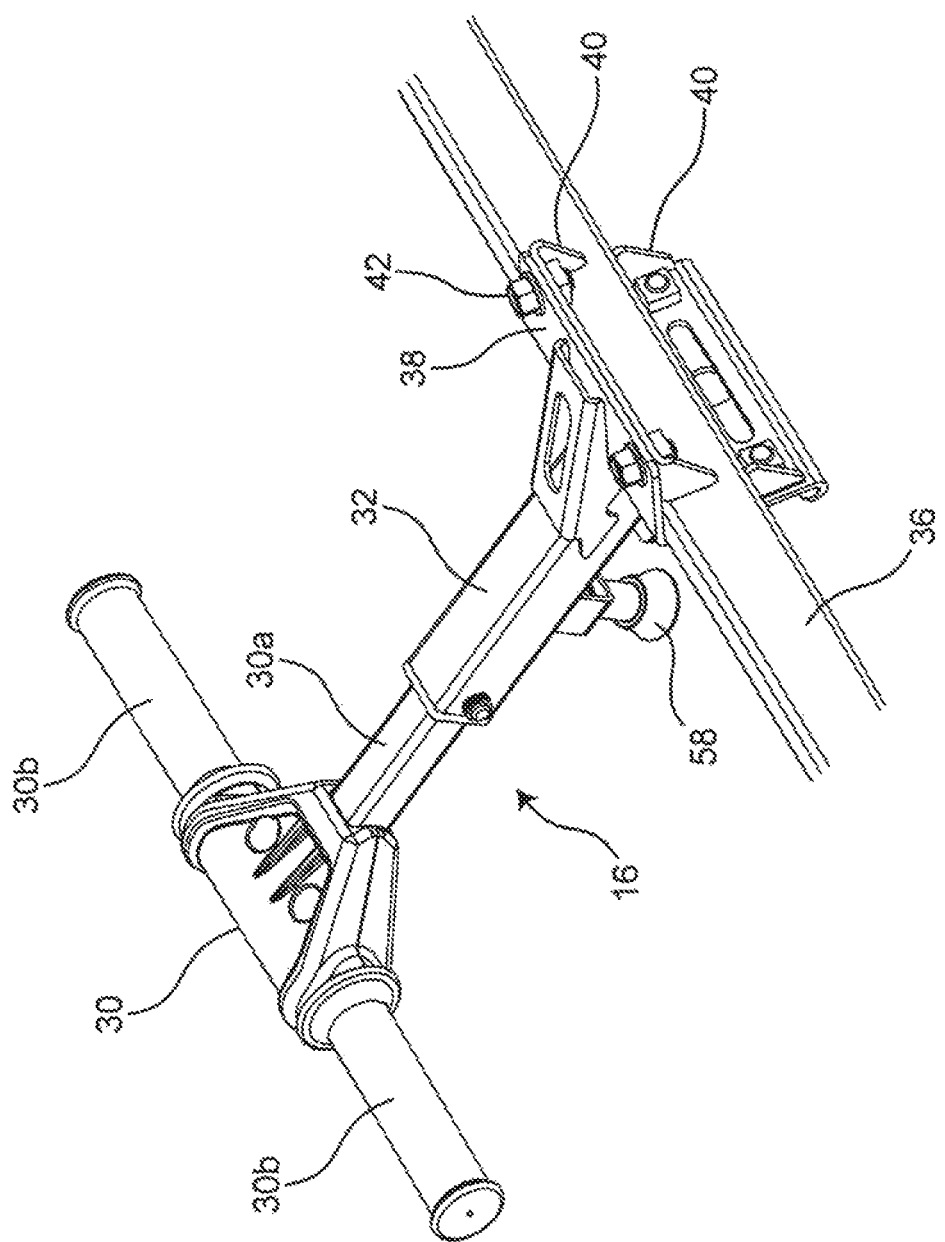
FIG. 8 is a perspective view of the passenger grip mounted to the frame.

As depicted in FIGS. 6 and 7, in the embodiment, the holder 32 of the passenger grip 16 is disposed in a space behind the dashboard 14. The holder 32 disposed in the space behind the dashboard 14 is attached toe frame (beam) 36 extending in the vehicle width direction of the utility vehicle 10. In the embodiment, the holder 32 is detachably attached to the beam 36 to allow the passenger grip 16 to be replaceable. Specifically, as depicted in FIG. 3, in the embodiment, the holder 32 is provided with an L-shaped bracket 38 having an engagement surface 38a (See FIG. 5) detachably engaged with the beam 36 having a rectangular cross section. As depicted in FIG. 8, a hook plate 40 is fixed to the bracket 38 by means of a bolt 42, so that the bracket 38 and the hook plate 40 grip the beam 36. The hook plate 40 is fixed to the beam 36, for example by welding. The holder 32 may be attached to the utility vehicle 10 at a position other than the beam 36. Furthermore, the holder 32 may be attached to the beam 36 in a manner other than the above.

The handle grip 30 is held by the holder 32 disposed in the space behind the dashboard 14, as depicted in FIG. 7, the dashboard 14 is provided with an arm through hole 14a. In the embodiment, the arm through hole 14a is provided above the glove box 18 (the box cover 20 thereof). The arm part 30a of the handle grip 30 penetrating the arm through hole 14a is held by the holder 32, and extends from the space behind the dashboard 14 toward a cabin space passenger seat 12). As depicted in FIG. 6, the arm through hole 14a is provided thereon with a hood 14b covering the arm through hole 14a to prevent the arm through hole 14a from standing out after the handle grip 30 is removed.

As depicted in FIGS. 3 to 5, the holder 3 is provided with a single-action lock mechanism 50 configured to fix the handle grip 30 to the holder 32.

As depicted in FIGS. 4 and 5, the single-action lock mechanism 50 includes a lock pin 52, a spring 54 biasing the lock pin 52, a housing 56 provided at the holder 32, and a knob 58 connected to the lock pin 52.

As depicted in FIG. 5, the arm part 30a of the handle grip 30 has a plurality of engagement holes 30c aligned in the extending direction of the arm part 30a. The holder 32 holding the arm part 30a has a through hole 32a. The handle grip 30 is fixed to the holder 32 by inserting a distal end 52a of the lock pin 52 through the through hole 32a of the holder 32 and engaging the distal end 52a with one of the engagement holes 30c of the arm part 30a. When the distal end 52a of the lock pin 52 is engaged with a different one of the engagement holes 30c, the arm part 30a of the handle grip 30 has a portion projecting from the holder 32 and having a different length. That is, the projecting portion of the arm part 30a of the handle grip 30 can be adjusted in length by changing the engagement hole 30c engaged with the distal end 52a of the lock pin 52.

In order to keep engagement between the engagement hole 30c of the handle grip 30 and the distal end 52a of the lock pin 52, in other words, in order to fix the handle grip 30 to the holder 32, the spring 64 biases the lock pin 52 toward the arm part 30a of the handle grip 30. In the embodiment, the lock pin 52 is disposed inside the spring 54. The lock pin 52 is thus provided with a snap ring 60 receiving a first end of the spring 54 (as depicted in FIG. 4, there is provided a groove 52b engaged with the snap ring 60).

The lock pin 52 and the spring 54 (as well as the snap ring 60) are accommodated in the housing 56 provided at the holder 32. The lock pin 52 is accommodated in the housing 56 movably forward and backward with respect to the engage merit hole 30c of the arm part 30a of the handle grip 30. The spring 54 has a second end received by the housing 56 and can thus bias the lock pin 52 (the snap ring 60 toward the engagement hole 30c.

The lock pin 52 has another end (opposite to the distal end 52a) connected to the knob 58 disposed outside the housing 56, When the crew moves backward the lock pin 52 by means of the knob 58 against biasing force of the spring 54, the distal end 52a of the lock pin 52 is disengaged from the engagement hole 30c of the handle grip 30. The handle grip 30 thus becomes movable forward or backward with respect to the holder 32, or can be detached from the holder 32. When the crew releases the knob 58 the lock pin 52 is moved forward by the biasing force of the spring 54, and the distal end 52a engages with the engagement hole 30c of the handle grip 30.

The single-action lock mechanism 58 thus configured allows the crew to cancel fixation between the holder 32 and the handle grip 30 with a single hand. The crew can thus operate alone the knob 58 with a first hand to cancel fixation between the holder 32 and the handle grip 30, and simultaneously move forward or backward the handle grip 30 with respect to the holder 32 or detach the handle grip 30 from the holder 32 with a second hand. That is, the passenger grip 16 is mounted and dismounted easily.

As depicted in FIG. 5, the lock pin 52 penetrates a through hole 56a of the housing 56 and the snap ring 60 is attached to the penetrated portion, so as not to fall off the housing 56. This prevents losing the lock pin 52.

Figure 9:
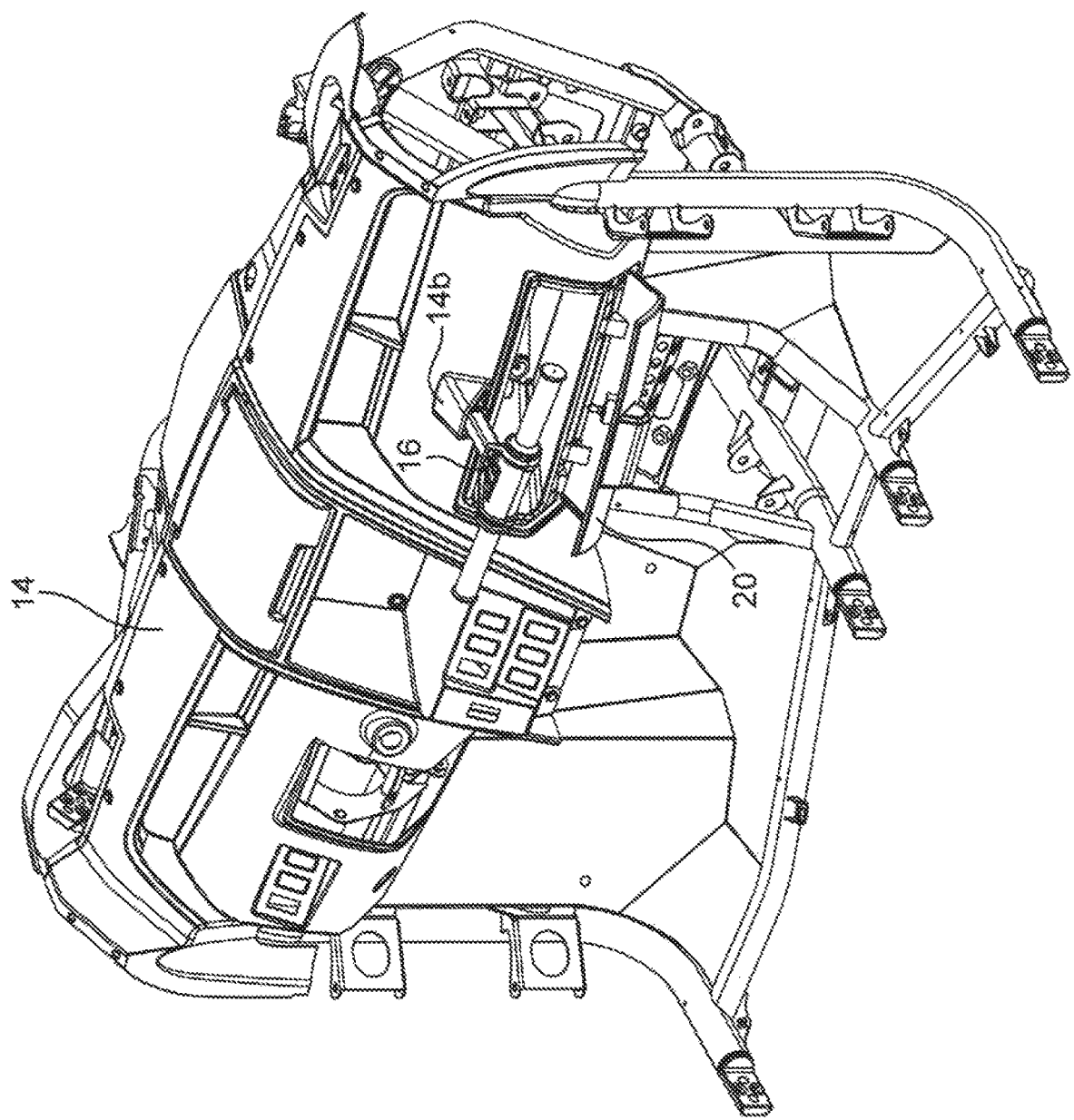
FIG. 9 is a perspective view of an opened glove box.
Figure 10:
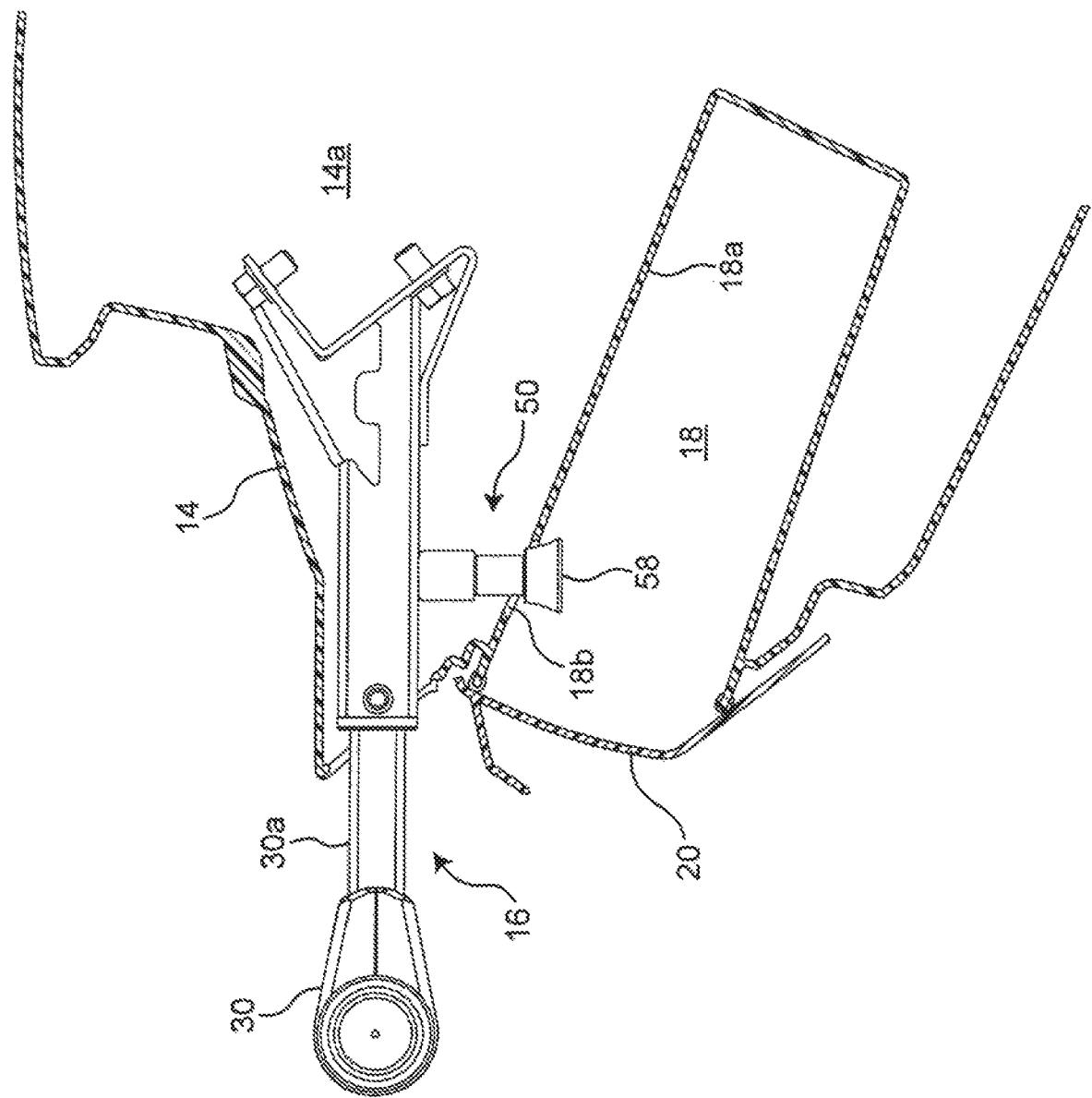
FIG. 10 is a sectional view of the glove box.

As depicted in FIGS. 9 and 10, in the embodiment, the single-action lock mechanism 50 is mostly positioned in the space behind the dashboard 14 whereas the knob 58 is positioned in the glove box 18. The crew thus needs to open the box cover 20 of the glove box 18 as depicted in FIG. 9 to access the knob 58. The knob 58 is disposed in the glove box 18 to prevent unintended disengagement of the handle grip 30 from the holder 32. In a case where the knob 58 is disposed outside the glove box 18, the crew may involuntarily touch the knob 58 to cause unintended disengagement of the handle grip 30 from the holder 32.

The knob 58 of the single-action look mechanism 50 is preferably positioned adjacent to a ceiling surface 18a of an interior space of the glove box 18. The knob 58 thus disposed is unlikely to disturb entrance of goods into the glove box 18.

The bush 34 depicted in FIGS. 4 and 5 may be constituted by a single part or multiple parts.

Figure 11:
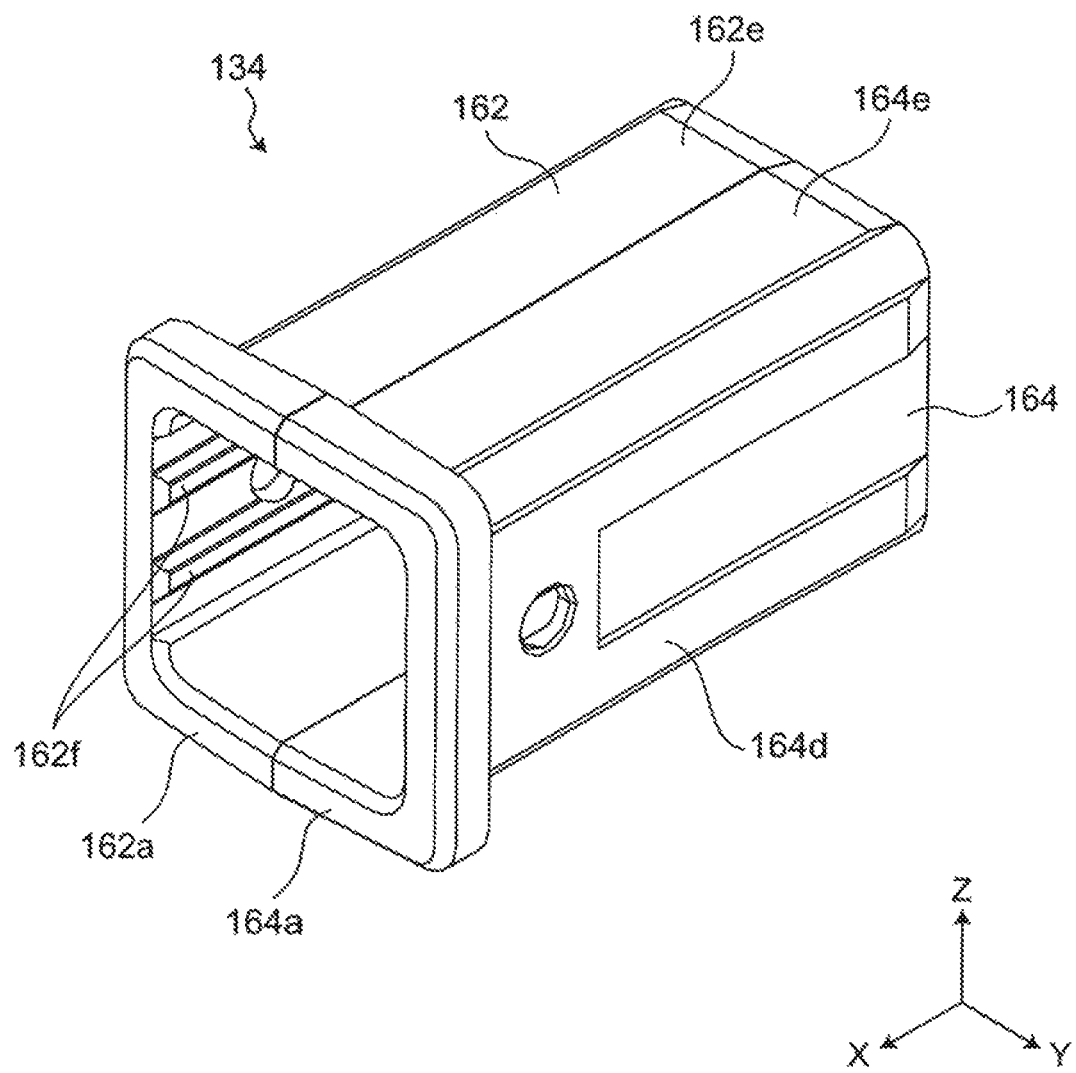
FIG. 11 is a perspective view of a bush constituted by two parts in a utility vehicle according to another embodiment.
Figure 12:
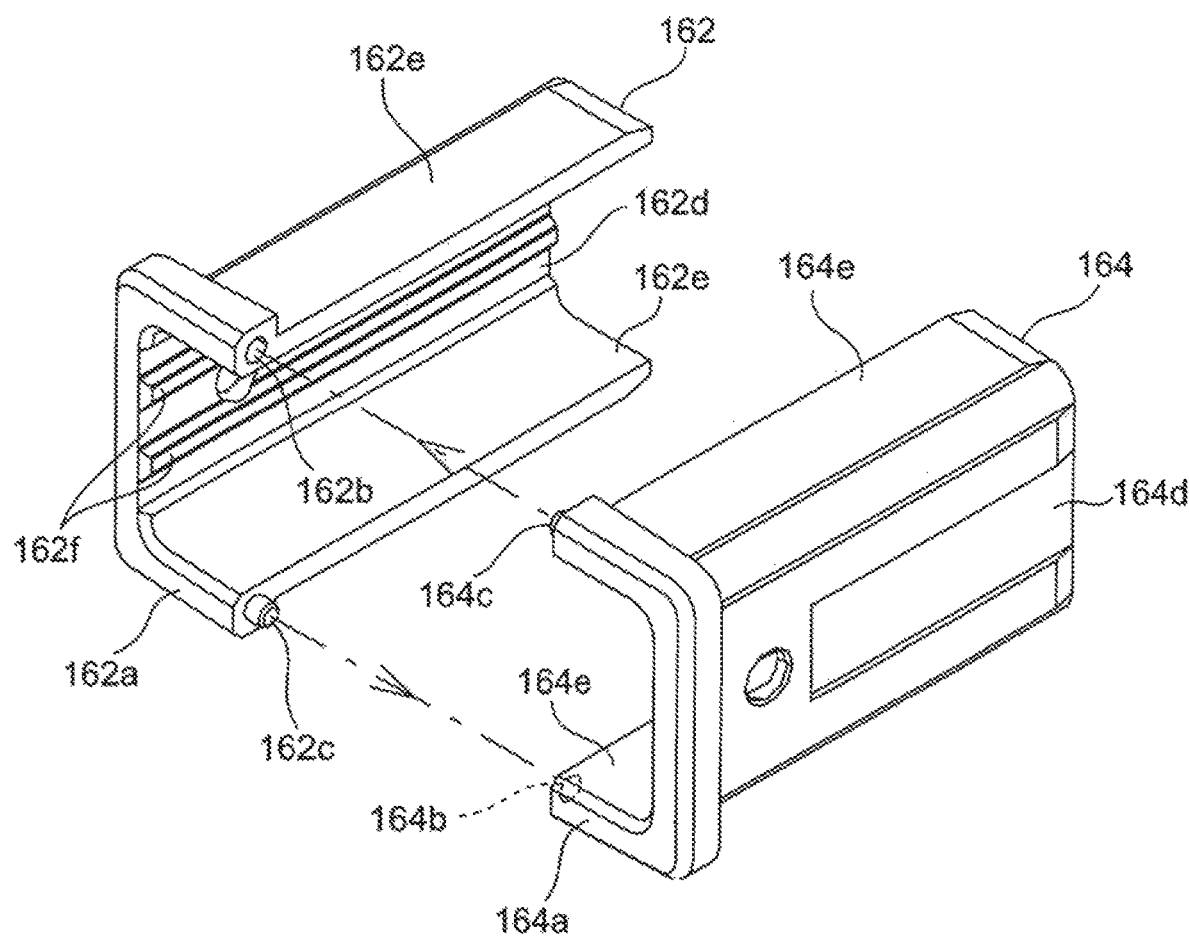
FIG. 12 is an exploded perspective view of the bush depicted in FIG. 11.
Figure 13:
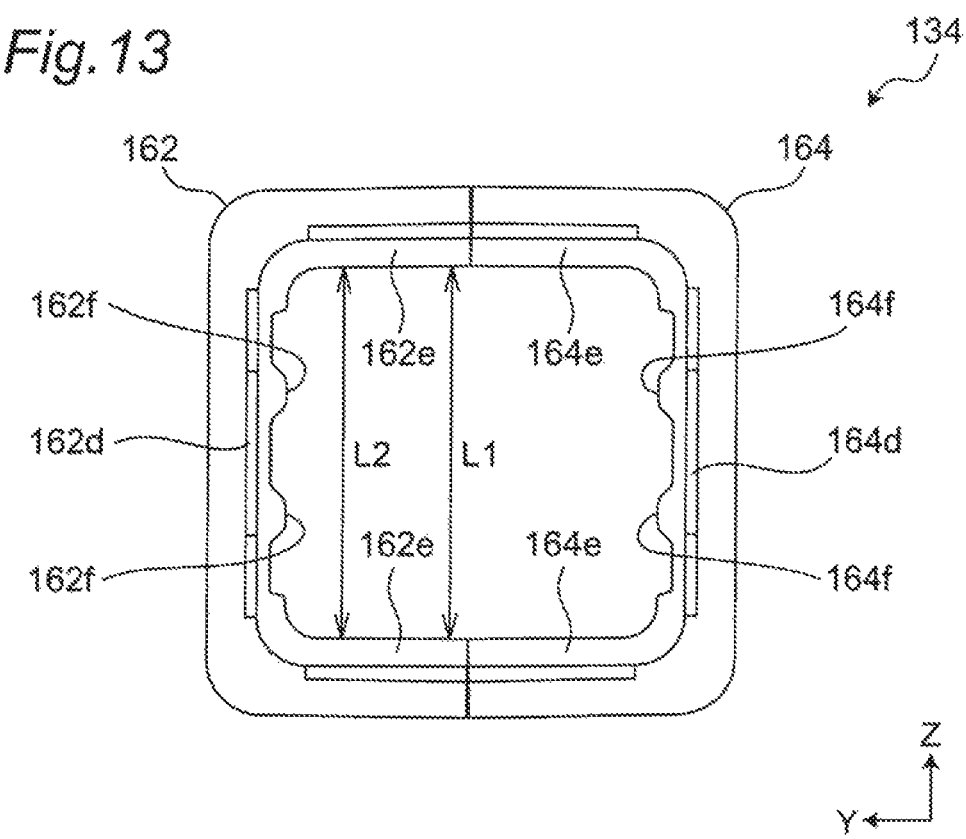
FIG. 13 is a rear view of the bush depicted in FIG. 11.
Figure 14:
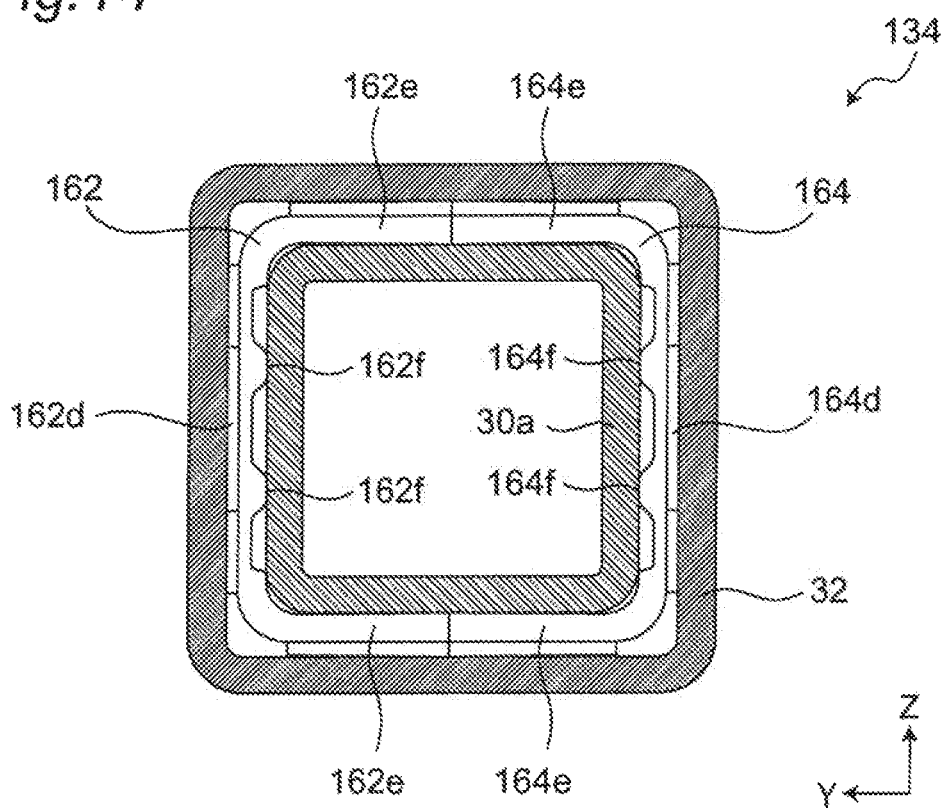
FIG. 14 is a rear view of the bush which is depicted in FIG. 11 and is attached to a holder with an arm part of a handle grip being inserted therethrough.

FIG. 11 is a perspective view of a bush constituted by multiple parts in a utility vehicle according to another embodiment. FIG. 12 is an exploded perspective view of the bush depicted in FIG. 11. FIG. 13 is a rear view of the bush depicted in FIG. 11. FIG. 14 is a rear view of the bush which is depicted in FIG. 11 and is attached to the holder with an arm part of a handle grip being inserted therethrough.

In the drawings, the X-axis direction (first direction) indicates the extending direction of the arm part 30a of the handle grip 30, that is, the direction in which the arm part 30a moves forward and backward within the holder 32. The Y-axis direction (second direction) and the Z-axis direction (third direction) are both orthogonal to the X-axis direction, and are mutually orthogonal. In the present embodiment, as depicted in FIG. 4, the Y-axis direction coincides with the extending direction of the grip part 30b of the handle grip 30. However, the Z-axis direction may instead coincide with the extending direction of the grip part 30b.

As depicted in FIG. 11, the bush 134 in the utility vehicle according to another embodiment is constituted by two parts 162 and 164 which are engaged with each other in the Y-axis direction. In the present embodiment, the two parts 162 and 164 are the same semi-cylindrical members 162 and 164 having the same semi-cylindrical shape. Therefore, the manufacturing cost of the bush 134 is reduced, as compared to the case where the two parts are different from each other with different shapes.

The two semi-cylindrical members (first and second semi-cylindrical members) 162 and 164 which have the same shape and constitute the bush 134 are made of a resin material. In the present embodiment, to enable engagement between the first and second semi-cylindrical members 162 and 164 in the Y-axis direction, the first and second semi-cylindrical members 162 and 164 are provided with engagement holes 162b and 164b formed in flange parts 162a and 164a (more precisely, parts that constitute a flange of the bush 134 when being engaged with each other) and engagement pins 164c and 162c which are engaged with the engagement holes 162b and 164b, respectively. The two semi-cylindrical members 162 and 164 are attached to the holder 32 while being engaged with each other.

As depicted in FIG. 13, the first semi-cylindrical member 162 includes a bottom wall 162d and a pair of side walls 162e extending from both ends of the bottom wall 162d in the Z-axis direction. Similarly, the second semi-cylindrical member 164 includes a bottom wall 164d and a pair of side walls 164e extending from both ends of the bottom wall 164d in the Z-axis direction. When the first and second semi-cylindrical members 162 and 164 engage with each other, the tip parts of the side walls 162e and 164e come in contact with each other.

As depicted in FIG. 14, when the first and second semi-cylindrical members 162 and 164 are engaged with each other to form the bush 134 the respective bottom walls 162d and 164d face each other in the Y-axis direction across the arm part 30a of the handle grip 30. The arm part 30a of the handle grip 30 is present between the pair of side walls 162e of the first semi-cylindrical member 162. Further, the arm part 30a of the handle grip 30 is present between the pair of side walls 164e of the second semi-cylindrical member 4.

As depicted in FIG. 14, the bottom wall 162d of the first semi-cylindrical member 162 and the bottom wall 164d of the second semi-cylindrical member 164 are provided with guide surface parts 162f and 164f which can be in surface contact with the outer surface of the arm part 30a of the handle grip 30 in a slidable manner, that is, which are parallel to the X-axis direction that is the direction in which the arm part 30a moves forward and backward. In the present embodiment, the guide surface, part 162f is defined by a top surface of a protrusion which is provided to extend in the X-axis direction on the inner surface of the bottom wall 162d, as depicted in FIG. 12. Similarly, the guide surface part 164f is defined by a top surface of a protrusion which is provided to extend in the X-axis direction on the inner surface of the bottom wall 164d.

The guide surface parts 162f and 164f of the first and second semi-cylindrical members 162 and 164 are substantially flat and parallel to each other when the bush 134 is assembled. Further, the guide surface parts 162f and 164f face each other in the Y-axis direction. As a result, the guide surface parts 162f and 164f respectively come in surface contact with the outer surface of the arm part 30a of the handle grip 30, and thus, hold the arm part 30a in the Y-axis direction so as to be slidable in the X-axis direction. Such guide surface parts 162f and 164f suppress vibration and rattling of the detachable handle grip 30 (the arm part 30a thereof) in the Y-axis direction.

In order to form the guide surface parts 162f and 164f which are parallel to each other and which have flat surfaces capable of being in surface contact with the outer surface of the arm part 30a of the handle grip 30, the bush 134 is constituted by two parts, that is, the first and second semi-cylindrical members 162 and 164. In order to explain the reason, a bush constituted by a single part according to a comparative example will be described.

Figure 15:
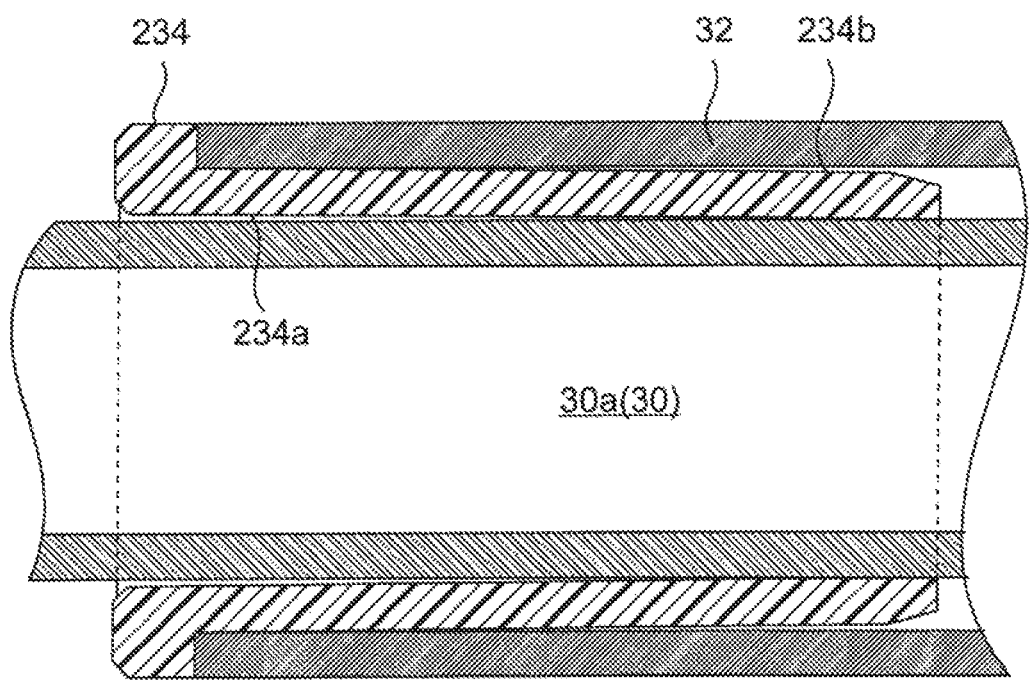
FIG. 15 is a sectional view of a bush constituted by a single part according to a comparative example.

FIG. 15 is a sectional view of the bush constituted by a single part according to the comparative example.

The bush 234 according to the comparative example depicted in FIG. 15 is also made of a resin material, like the bush 134 in the above-described embodiment. The bush made of resin is basically manufactured using a old in consideration of mass productivity.

The bush 234 according to the comparative example depicted in FIG. 15 is manufactured using a mold for molding an inner surface 234a of the bush 234 and a mold for molding an outer surface 234b. When the molding is completed, the respective molds are moved in the X-axis direction to release the molded bush 234. For this reason, drafts are provided on the inner surface 234a and the outer surface 234b of the bush 234.

Due to the drafts, the inner surface 234a of the bush 234 cannot substantially be in surface contact with the outer surface of the arm part 30a of the handle grip 30, as depicted in FIG. 15. Similarly, due to the drafts, the outer surface 234b of the bush 234 cannot substantially be in surface contact with the inner surface of the holder 32. Therefore, the handle grip 30 (the arm part 30a thereof) inserted into the bush 234 may rattle.

In order to suppress the rattling of the handle grip 30 caused by the drafts as described above, the bush 134 is constituted by the first semi-cylindrical member 162 and the second semi-cylindrical member 164 which are engaged with each other in the Y-axis direction, as depicted in FIG. 13. In the case of the first and second semi-cylindrical members 162 and 164 described above, the first and second semi-cylindrical members 162 and 164 can be released by moving a mold for molding the inner surface and a mold for molding the outer surface in the Y-axis direction. Therefore, guide surface parts 162f and 164f parallel to the X-axis direction can be formed on the inner surfaces of the first and second semi-cylindrical members 162 and 164. Accordingly, in order to form such guide surface parts 162f and 164f, the bush 134 is constituted by two parts, that is, the first and second semi-cylindrical members 162 and 164.

Since the molds which are moved in the Y-axis direction to release the first and second semi-cylindrical members 162 and 164 are used, drafts are provided on the inner and outer surfaces of the respective side walls 162e and 164e. Therefore, as depicted in FIG. 13, each of the pairs of side walls 162e and 164e of the first and second semi-cylindrical members 162 and 164 extends from the corresponding bottom wall 162d or 164d so as to be away from each other with distance from the corresponding bottom wall. For example, as depicted in FIG. 13, the distance L1 between the pair of side walls 162e at the farthest position from the bottom wall 162d is larger than the distance L2 between the pair of side walls 162e at the closest position to the bottom wall 162d.

Therefore, when the first and second semi-cylindrical members 162 and 164 are attached to the holder 32, the tip parts (farthest ends from the bottom wall 162d) of the pair of side, walls 162e of the first semi-cylindrical member 162 are deformed to be close to each other as depicted in FIG. 14. At the same time, the tip parts (farthest ends from the bottom wall 164d) of the pair of side walls 164e of the second semi-cylindrical member 164 are deformed to be close to each other.

Due to the deformation of the pair of side walls 162e of the first semi-cylindrical member 162 as described above the pair of side walls 162e hold the arm part 30a of the handle grip 30 therebetween in the Z-axis direction. Similarly, due to the deformation of the pair of side walls 164e of the second semi-cylindrical member 164, the pair of side walls 164e hold the arm part 30a of the handle grip 30 therebetween in the Z-axis direction. As a result of such holding, vibration and rattling of the handle grip 30 (the arm part 30a thereof) in the Z-axis direction are suppressed.

The bush 134 which is depicted in FIG. 11 and constituted by the two semi-cylindrical members 162 and 164 can suppress vibration and rattling of the arm part 30a of the handle grip 30 inserted into the bush 134 in the direction (Y-axis direction and Z-axis direction) orthogonal to the extending direction (X-axis direction) of the arm part 30a.

Various modifications are possible for the bush constituted by two semi-cylindrical members.

FIG. 16 is a rear view of a bush in a utility vehicle according to still another embodiment.

As depicted in FIG. 16, the bush 334 in the utility vehicle according to still another embodiment is also constituted by first and second semi-cylindrical members 362 and 364 like the bush 134 described above. Similar to the first and second semi-cylindrical members 162 and 164 described above, the first and second semi-cylindrical members 362 and 364 have bottom walls 362d and 364d, and pairs of side walls 362e and 364e, the bottom walls 362d and 364d including guide surface parts 362f and 364f. Furthermore, each of the pairs of side walls 362e and 364e of the first and second semi-cylindrical members 362 and 364 extends from the corresponding bottom wall 362d or 364d so as to be away from each other with distance from the corresponding bottom wall 362d or 364d.

However, unlike the first and second semi-cylindrical members 162 and 164 described above, the first and second semi-cylindrical members 362 and 364 of the bush 334 also have guide surface parts 362g and 364g, which come in surface contact with the outer surface of the arm part 30a of the handle grip 30, on the pairs of side walls 362e and 364e, respectively. Specifically, the side wall 362e of the pair of side walls 362e of the first semi-cylindrical member 362 on one side (the lower side in the drawing) in the Z-axis direction includes the guide surface part 362g. Further the side wall 364e of the pair of side walls 364e of the second semi-cylindrical member 364 on the other side (the upper side in the drawing) in the Z-axis direction includes the guide surface part 364g.

In the first semi-cylindrical member 362, the guide surface parts 362f and 362g are flat surfaces whose normal lines are orthogonal to each other. Further, in the second semi-cylindrical member 364, the guide surface parts 364f and 364g are flat surfaces whose normal lines are orthogonal to each other.

According to the first and second semi-cylindrical members 362 and 364 described above, the handle grip 30 (the arm part 30a thereof) is prevented from vibrating or rattling not only in the Y-axis direction but also in the Z-axis direction by the guide surface parts 362f, 362g, 364f, and 364g.

The embodiment described above exemplifies the technique of the present invention. The accompanying drawings and the detailed description are provided for the exemplification. Those constituent elements depicted in the accompanying drawings and disclosed in the detailed description will include constituent elements essential for achievement of the object as well as constituent elements not essential for achievement of the object but for exemplification of the technique. Accordingly, those inessential constituent elements should not be regarded as being essential simply because the inessential constituent elements are depicted in the accompanying drawings or are disclosed in the detailed description.

The above embodiment is provided for exemplification of the technique according to the present invention, and will thus accept modification, replacement, addition, removal, and the like in various manners within the scope of the patent claims or an equivalent scope.

The invention claimed is:

1. A utility vehicle comprising
   a passenger grip for a crew seated on a passenger seat,
   the passenger grip including
      a handle grip provided with an arm part that extends in a first direction from a dashboard toward the passenger seat and that has a shape of a quadrangular prism, and a grip part provided at the arm part and gripped by the crew seated on the passenger seat,
      a holder that is outserted to the arm part of the handle grip, holds the arm part movably forward and backward in the first direction, and has a rectangular tubular shape,
      a bush that is inserted into the holder, guides the arm part of the handle grip so as to be movable forward and backward, is made of a resin material, and has a rectangular tubular shape, and
      a single-action lock mechanism provided at the holder and fixing the handle grip to the holder,
      the single-action lock mechanism including
         a lock pin having a distal end penetrating a through hole provided at the holder and engaged with at least one engagement hole provided at the arm part,
         a spring biasing the lock pin toward the arm part,
         a housing fixed to the holder and accommodating the lock pin and the spring, and
         a knob disposed outside the housing and connected to the lock pin,
      the bush including
         a first semi-cylindrical member and a second semi-cylindrical member that face each other in a second direction orthogonal to the first direction, and
   at least one guide surface part provided on at least one of inner surfaces of the first and second semi-cylindrical members, the guide surface part being a flat surface parallel to the first direction and coming in surface contact with the arm part of the handle grip in a slidable manner.

2. The utility vehicle according to claim 1, wherein
   the first and second semi-cylindrical members respectively have bottom walls that face each other in the second direction across the arm part of the handle grip, each of the bottom walls including the guide surface part.

3. The utility vehicle according to claim 2, wherein
the first and second semi-cylindrical members respectively have pairs of side walls that extend from both ends of the bottom walls in a third direction orthogonal to both the first direction and the second direction, each of the pairs of side walls extending from the corresponding bottom wall so as to be away from each other with distance from the bottom wall.

4. The utility vehicle according to claim 3, wherein
the side wall on one side in the third direction of the pair of side walls in the first semi-cylindrical member includes the guide surface part, and
the side wall on the other side in the third direction of the pair of side walls in the second semi-cylindrical member includes the guide surface part.

5. The utility vehicle according to claim 1, wherein
the first and second semi-cylindrical members include engagement parts which are engaged with each other.

6. The utility vehicle according to claim 1, wherein
the first and second semi-cylindrical members are identical.

\* \* \* \* \*